United States Patent
Lacey et al.

(10) Patent No.: US 9,871,329 B1
(45) Date of Patent: Jan. 16, 2018

(54) TERMINAL ASSEMBLIES SUITABLE FOR POWER RECEPTACLES WITH THERMAL PROTECTION AND ASSOCIATED METHODS

(71) Applicant: Eaton Corporation, Cleveland, OH (US)

(72) Inventors: Darron Kirby Lacey, Peachtree City, GA (US); Erik Jeffrey Gouhl, Fayetteville, GA (US); Alex Zhuang, ShangHai (CN); George Zhang, Shanghai (CN); Tom Xiong, Shanghai (CN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/427,889

(22) Filed: Feb. 8, 2017

(51) Int. Cl.
*H01R 13/648* (2006.01)
*H01R 13/713* (2006.01)
*H02H 5/04* (2006.01)

(52) U.S. Cl.
CPC ......... *H01R 13/7137* (2013.01); *H02H 5/048* (2013.01)

(58) Field of Classification Search
CPC ................................................. H01R 13/7137
USPC ........................ 439/620.08; 361/105; 337/91
See application file for complete search history.

(56) References Cited

U.S. PATENT DOCUMENTS

| | | | | |
|---|---|---|---|---|
| 1,641,002 A | * | 8/1927 | Kaplan | H01R 13/7137 337/109 |
| 1,850,206 A | * | 3/1932 | Hertzberg | H01R 13/7137 337/102 |
| 2,399,406 A | * | 4/1946 | Toth | H01R 13/713 337/109 |
| 2,508,637 A | * | 5/1950 | Bolesky | H01R 13/713 337/113 |
| 2,783,329 A | * | 2/1957 | Jackson | H01H 77/04 337/113 |
| 3,546,650 A | * | 12/1970 | Phillip | H01H 73/30 337/113 |

(Continued)

OTHER PUBLICATIONS

Aperam Alloys Imphy "Thermostat Components Alloys" www.aperam.com/alloys-imphy (1 page) (Jun. 2012).

(Continued)

*Primary Examiner* — Neil Abrams
(74) *Attorney, Agent, or Firm* — Myers Bigel, P.A.

(57) ABSTRACT

Terminal assemblies for power receptacles or switches or other electrical devices include a first terminal holding a first terminal screw and a second terminal adjacent the first terminal and holding a second terminal screw. The terminal assembly also includes a thermal protection plate having longitudinally opposed first and second end portions, the first end portion affixed to the first terminal and the second end portion attached to the second terminal. The thermal protection plate has an electrical conductive contact residing between the first and second end portions, closer to the second end portion than the first end portion. The thermal protection plate has a first material with a first thermal coefficient of expansion overlying or underlying a second material with a second thermal coefficient of expansion with the second thermal coefficient of expansion greater than the first thermal coefficient of expansion.

20 Claims, 7 Drawing Sheets

(56) References Cited

U.S. PATENT DOCUMENTS

| | | | | |
|---|---|---|---|---|
| 3,601,660 | A * | 8/1971 | Brandt | B60D 1/62 |
| | | | | 200/51 R |
| 6,166,618 | A * | 12/2000 | Robertson | H01H 37/765 |
| | | | | 307/86 |
| 7,232,971 | B2 | 6/2007 | Chen | |
| 7,241,176 | B2 * | 7/2007 | Wang | H01R 13/6666 |
| | | | | 439/620.21 |
| 7,385,473 | B2 * | 6/2008 | Fabian | H01H 37/5409 |
| | | | | 337/113 |
| 7,501,926 | B2 * | 3/2009 | Watchorn | H01H 37/5409 |
| | | | | 337/113 |
| 8,864,505 | B2 * | 10/2014 | Chuang | H01R 13/713 |
| | | | | 200/51.02 |
| 9,178,300 | B1 * | 11/2015 | Huang | H01R 24/30 |

OTHER PUBLICATIONS

Photographs of Two Prior Art Products—Appliance Switch and Heat Protector Products with Bimetallic Strip—External and Disassembled Views (2 pages) (date unknown, but prior to filed of the present application).

* cited by examiner

TERMINAL ASSEMBLIES SUITABLE FOR POWER RECEPTACLES WITH THERMAL PROTECTION AND ASSOCIATED METHODS

FIELD OF THE INVENTION

The present invention relates to electrical devices such as power receptacles.

BACKGROUND OF THE INVENTION

Electrical devices such as power receptacles of various amperage rating can be exposed to over temperature and/or over current conditions.

SUMMARY OF EMBODIMENTS OF THE INVENTION

Embodiments of the present invention are directed to power receptacles with an internal plate that can deflect and/or deform to interrupt a circuit providing power when over a rated current and/or over a defined elevated temperature.

Embodiments of the invention are directed to a terminal assembly that includes first terminal holding a first terminal screw, a second terminal adjacent the first terminal and holding a second terminal screw, and a thermal protection plate having longitudinally opposed first and second end portions, the first end portion affixed to the first terminal and the second end portion attached to the second terminal. The thermal protection plate includes an electrical conductive contact residing between the first and second end portions, closer to the second end portion than the first end portion. The thermal protection plate includes a first material with a first thermal coefficient of expansion overlying or underlying a second material with a second thermal coefficient of expansion with the second thermal coefficient of expansion greater than the first thermal coefficient of expansion.

In position, the second material with the second thermal coefficient of expansion can reside under or behind the first material.

The thermal protection plate can have a thickness in a range of 0.1 mm and 10 mm and a width in a range of 4 mm and 12 mm.

The second thermal coefficient of expansion can be at least twice that of the first thermal coefficient of expansion in a temperature range between 26 degrees Celsius and 70 degrees Celsius.

In position and in a normal operating configuration, the thermal protection plate can have a first configuration. In response to an over temperature condition that is above a defined temperature, the second end portion of the thermal protection plate can move toward the reset member while attached to the second terminal and while the first end portion is affixed to the first terminal. The reset member can engage the thermal protection plate and push it to return to the first configuration.

The first end portion of the thermal protection plate can include an attachment pad and is statically affixed to the first terminal. The second terminal can have a primary body holding an inwardly extending segment that is parallel to a longitudinal axis of the first and second terminal screws and can be attached to the second end portion of the thermal protection plate.

The assembly can be used in combination with a power receptacle device and/or electrical switch device. The device has a housing and a reset member held by the housing. The terminal assembly can be held in the housing with the thermal protection plate in communication with the reset member.

The device can be a power receptacle with a cover having at least one electrical outlet.

The device can include a receptacle structure in the housing in cooperating alignment with the terminal assembly. The receptacle structure can include an electrical contact that engages the electrical conductive contact of the thermal protection plate during normal operating conditions.

The second end portion of the thermal protection plate can be attached to a spring pad that is attached to the inwardly extending segment of the second terminal to provide the attachment of the second end portion of the thermal protection plate to the second terminal. During normal operating conditions, the spring pad can cooperate with the second end portion of the thermal protection plate to hold the thermal protection plate in a first configuration with the electrical conductive contact of the thermal protection plate contacting the electrical contact of the receptacle. In response to an over temperature condition, the thermal protection plate can change shape to have a second configuration which moves the thermal protection plate electrical conductive contact toward the reset member and disengages the receptacle electrical contact.

The electrical conductive contact of the thermal protection plate can have a body with a maximal surface area portion facing inward and residing below or behind the thermal protective plate in a direction away from the reset member.

The electrical conductive contact of the thermal protection plate can include silver in an amount in a range of 50-100%.

The assembly can be held in a power receptacle device.

The power receptacle device can include a cover with first and second electrical outlets attached to the housing. The first and second terminals reside inside the housing adjacent one long side thereof and can be a first set of terminals with respective terminal screws.

The device can further include a second set of terminals laterally spaced apart from and facing the first set of terminals and includes a second thermal protection plate protection plate having longitudinally opposed first and second end portions. The first end portion can be affixed to the first terminal of the second set of terminals and the second end portion can be attached to the second terminal of the second set of terminals. The second thermal protection plate can be parallel to the thermal protection plate of the first set of terminals. The second thermal protection plate can include an electrical conductive contact residing between the first and second end portions, closer to the second end portion than the first end portion. The second thermal protection plate can have a first material with a first thermal coefficient of expansion overlying a second material with a second thermal coefficient of expansion with the second thermal coefficient of expansion greater than the first thermal coefficient of expansion.

The device can have a ground strap coupled to the housing.

The first terminal of the terminal assembly can have a primary body with a terminal screw aperture and the primary body of the first terminal can hold an inwardly extending segment with a planar segment that is attached to the first end portion of the thermal protection plate.

The second terminal of the terminal assembly can have a primary body with a terminal screw aperture. The primary body of the second terminal can hold an inwardly extending arm with a planar segment that is attached to the second end portion of the thermal protection plate to attach the second end portion to the second terminal assembly.

The second end portion of the thermal protection plate can have a tab end that is attached to a slot in a planar segment of an inwardly extending arm of the second terminal. The assembly can also include first and second clamps with terminal screw apertures attached to the first and second terminals, respectively.

The thermal protection plate can have first and second different nickel alloy materials as the first and second materials.

The thermal protection plate can include Ni22Cr3 as the second material.

The thermal protection plate can include Ni36 as the first material.

Other embodiments are directed to methods of operating a power receptacle. The methods include: (a) electrically powering a power receptacle using a terminal assembly with a thermal protection plate that is attached at a first end portion to a first terminal and attached at a second end portion to a second terminal with an electrical contact in electrical communication with a receptacle electrical contact to provide a load circuit when the thermal protection plate has a first normal operating configuration; (b) mechanically changing a shape of the thermal protection plate to a second different configuration while the first and second ends portions remain attached to the corresponding first and second terminals in response to exposure to an elevated temperature condition to move the electrical contact of the thermal protection plate away from the receptacle electrical contact and disconnect the load circuit; and (c) pressing against a reset member to push the thermal protection plate inward and back into the first normal operating configuration to reconnect the load circuit.

The second terminal can have an inwardly extending arm that is attached to a spring pad, wherein the spring pad is attached to the second end portion of the thermal protection strip and allows the second end portion of the thermal protection strip to travel up toward the reset member in response to the exposure to the elevated temperature and also holds the second end portion down with the electrical contact against the receptacle electrical contact when the thermal protection plate is in the first normal operating configuration.

The power receptacle can have first and second sets of terminal assemblies laterally spaced apart and facing each other, each with a respective thermal protection plate as first and second thermal protection plates. The mechanically changing step can be carried out to concurrently mechanically change the shape of the first and second thermal protection plates to the second different configuration.

The internal plate can be attached at opposing ends to a terminal assembly and can hold an electrical contact member therebetween.

The internal plate can comprise first and second materials with different thermal coefficients of expansion.

The internal plate can be a bimetal alloy plate.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

Figure 1:
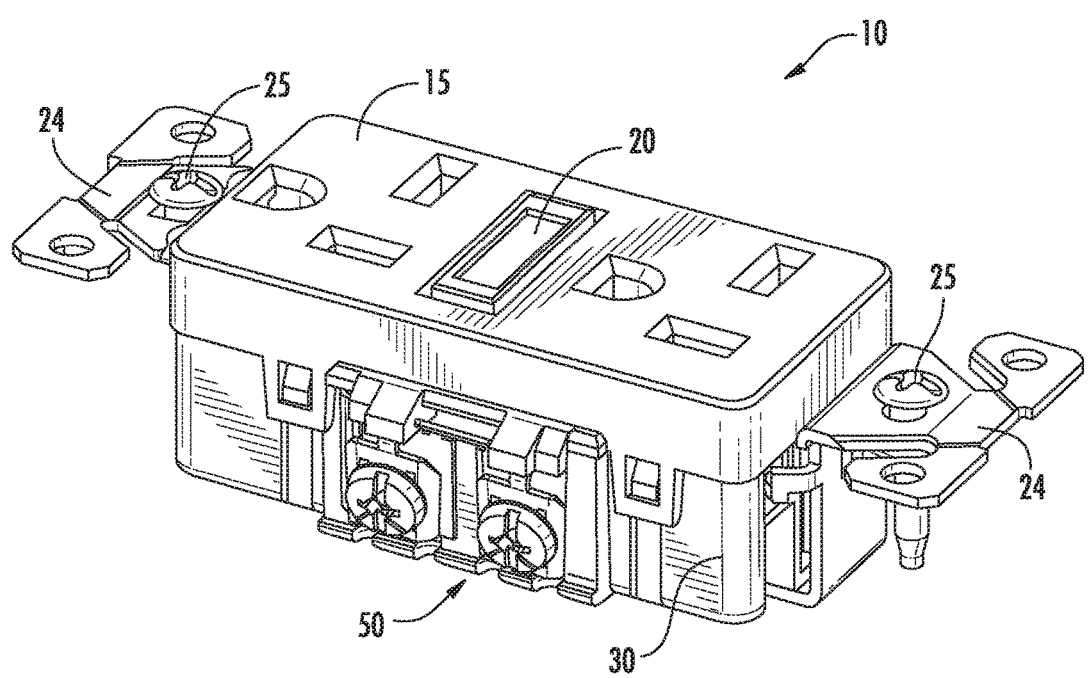
FIG. 1 is a front view of an exemplary power receptacle according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). Abbreviated versions of the word "Figure" such as "FIG." and "Fig." are used interchangeably in the application. Broken line boxes in the figures indicate optional features.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
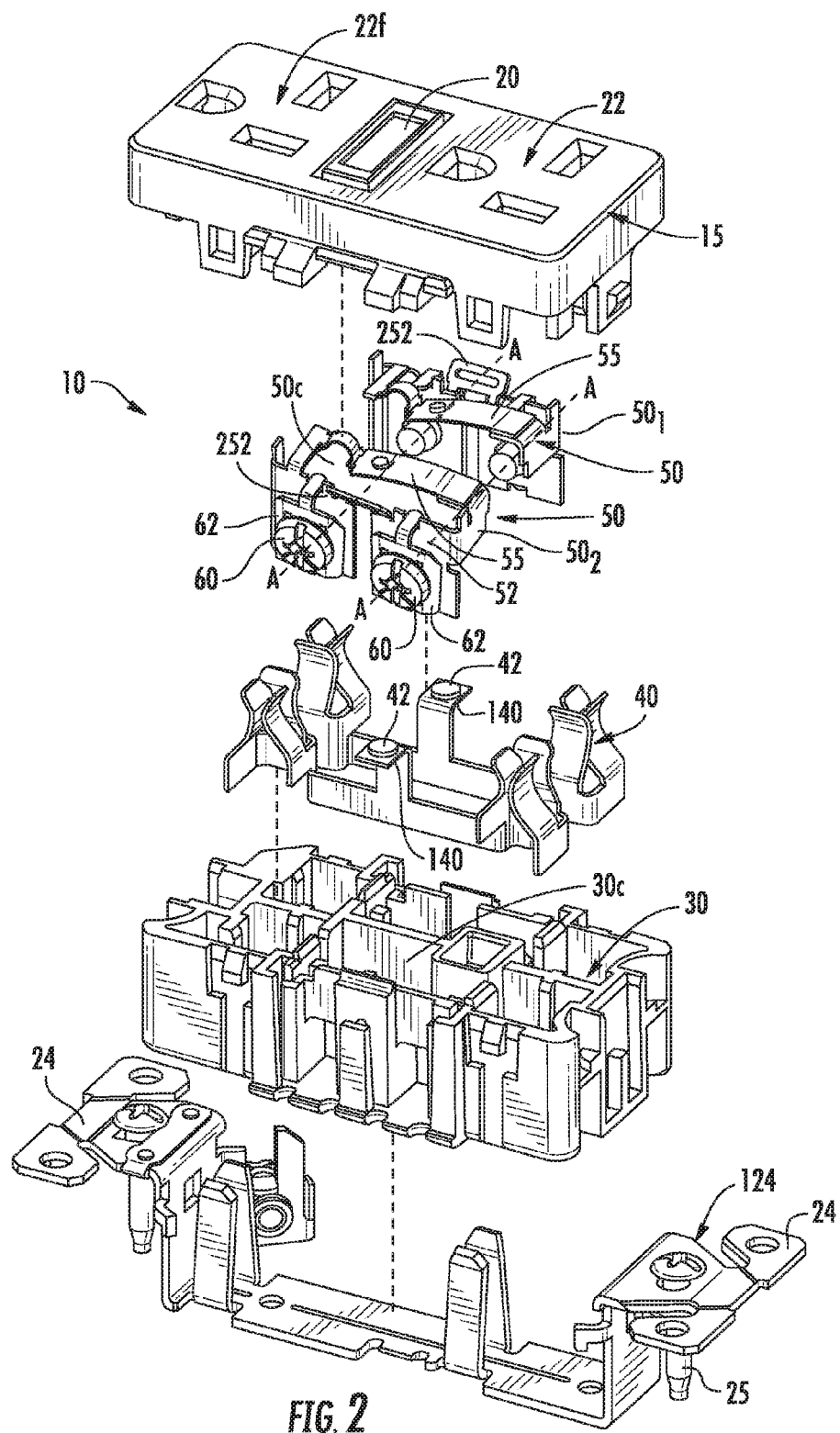
FIG. 2 is an exploded view of the power receptacle shown in FIG. 1 according to embodiments of the present invention.

Turning now to the figures, FIGS. 1 and 2 illustrate an exemplary power receptacle 10, also interchangeably referred to as a "receptacle" or "outlet". As is well known, a power receptacle is a point of connection between electrically powered devices, such as computers, and a power distribution system, such as a power distribution of a structure such as a building. The power receptacle 10 can be configured, for example, as an in-floor, in-wall device, surface-mount device, or a device integrated into another device or even as an appliance.

The receptacle 10 can have a top housing or cover 15 with at least one reset member 20 (i.e., push button) and a bottom housing or base 30 that are attached together. Referring to FIG. 2, the base 30 can have shaped cavities 30c that hold a receptacle 40 (also called a receptacle structure) with at least one, shown as a plurality of, spaced apart electrical contacts 42 that face the cover 15.

As shown in FIGS. 1 and 2, the cover 15 of the power receptacle 10 can comprise at least one electrical outlet 22. The electrical outlet 22 can have at least one female connector or socket 22f which is configured to receive male connectors (plug-in electrical connectors) that can electrically engage the internal electrical contacts 42. In some particular embodiments, the socket 22f can be a 3-prong socket.

As shown in FIGS. 1 and 2, the receptacle 10 can include outer bracket ears 24 that can include mounting (typically threaded) members 25 that can be used to attach to a desired structure for mounting the power receptacle 10. As shown in FIG. 2, the power receptacle 10 may include a strap 124 that can be attached to the bottom housing 30 and provide the ears 24. The strap 124 can be a ground strap.

Figure 3:
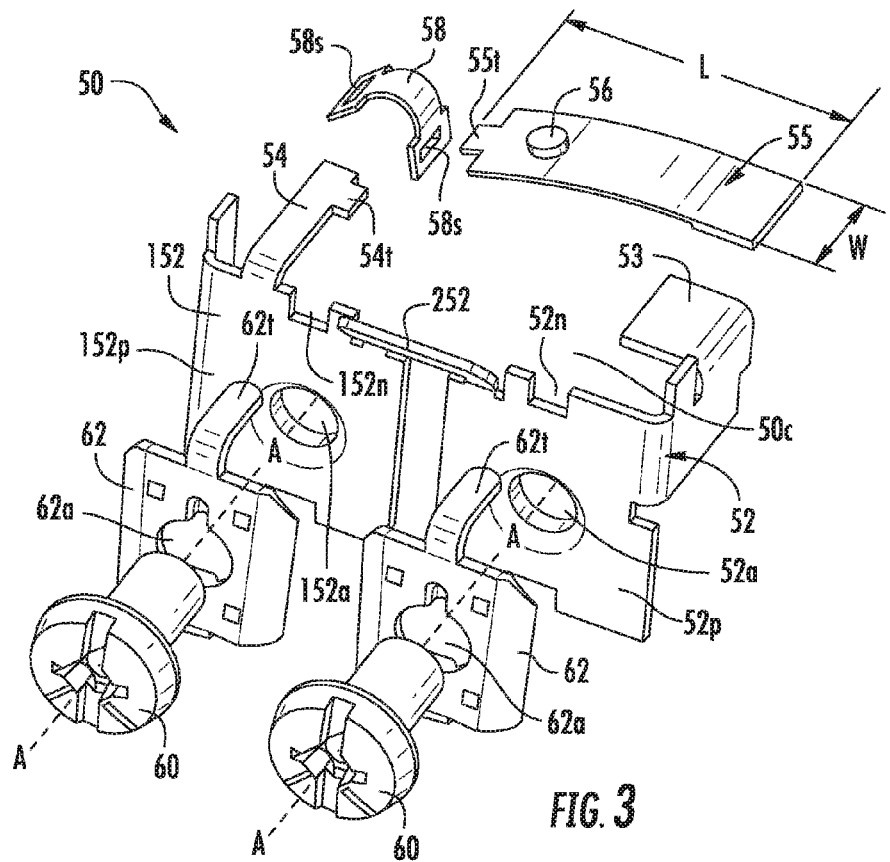
FIG. 3 is a partially exploded view of the terminal assembly shown in FIG. 2.
Figure 4:
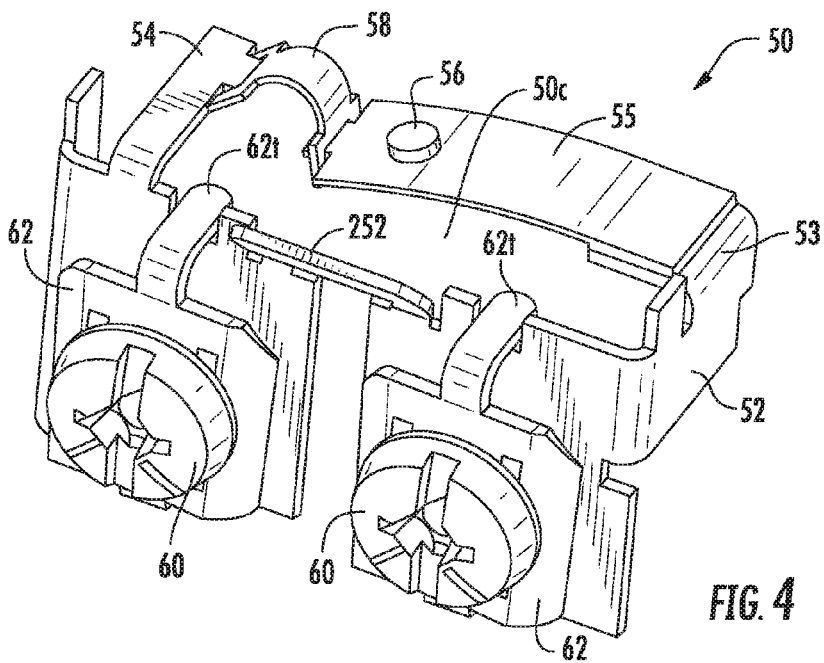
FIG. 4 is an enlarged assembled view of the terminal assembly shown in FIG. 3.

Referring now to FIGS. 2-4, the power receptacle 10 can include at least one internal receptacle 40 with a conductive contact member 42, shown as two laterally opposing contact members 42. The conductive contact members 42 can comprise silver or other suitably conductive material. The conductive contact members 42 are shown as circular but other shapes may be used.

Figure 5A:
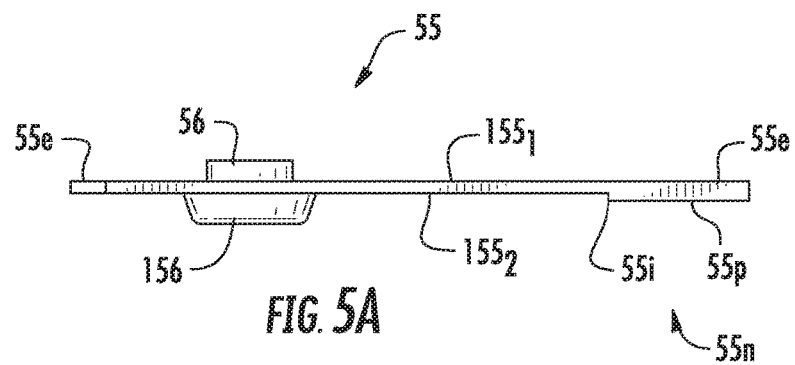
FIG. 5A is a side view of a thermal protection plate of the terminal assembly shown in FIGS. 2, 3 and 4, shown in a non-thermally stressed (normal) configuration.

Still referring to FIGS. 2-4, the power receptacle 10 can also include a terminal assembly 50 comprising terminal screws 60 and a thermal protection plate 55 that has a conductive contact member 56. The thermal protection plate 55 can have opposing longitudinally spaced apart end portions 55e (FIG. 5A) that remain secured to and adjacent first and second terminal members 52, 152, respectively. The thermal protection plate 55 can move the conductive contact member 56 between two different operative positions, a first normal operative position (FIG. 7A) where the conductive contact member 56 can electrically engage, typically directly contact, the receptacle conductive contact member 42, and a circuit interruption position (FIG. 7B) where the thermal protection plate 55 changes shape, i.e., it deflects and/or "deforms" to move the conductive contact member 56 away from the receptacle conductive contact member 42 to interrupt the normal operating load circuit, while remaining attached at each end portion 55e.

Figure 6A:
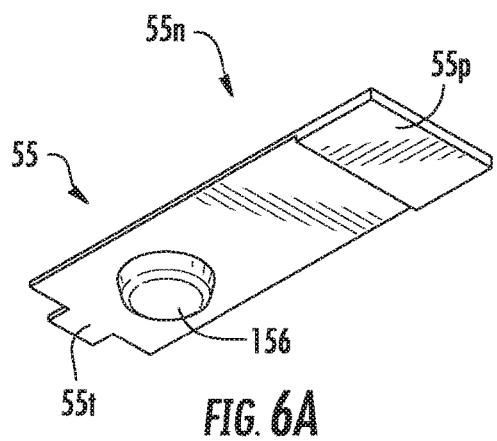
FIG. 6A is bottom, side perspective view of the thermal protection plate shown in FIG. 5A, in an original, non-thermally stressed, configuration.
Figure 6B:
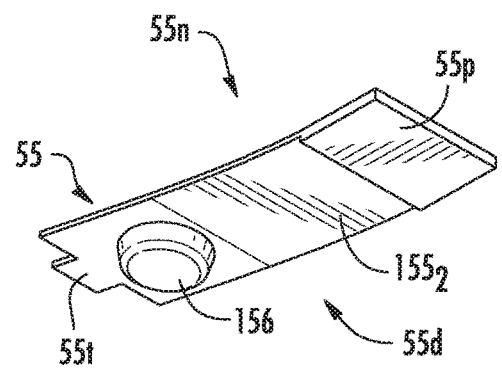
FIG. 6B is a bottom, side perspective view of the plate shown in FIG. 6A, in a deflected or deformed configuration according to embodiments of the present invention.
Figure 7A:
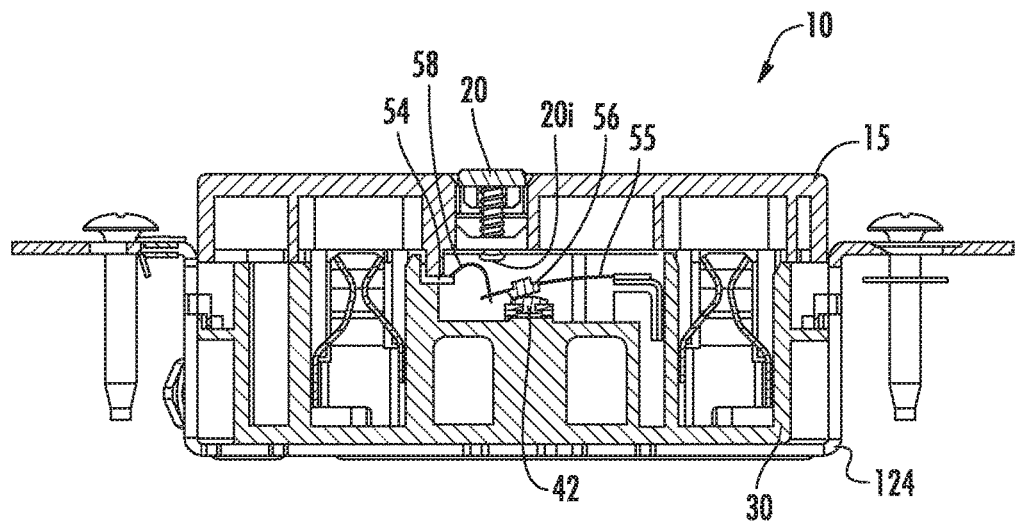
FIG. 7A is a side section view of an assembled power receptacle with the thermal protection plate in a normal working configuration according to embodiments of the present invention.
Figure 7B:
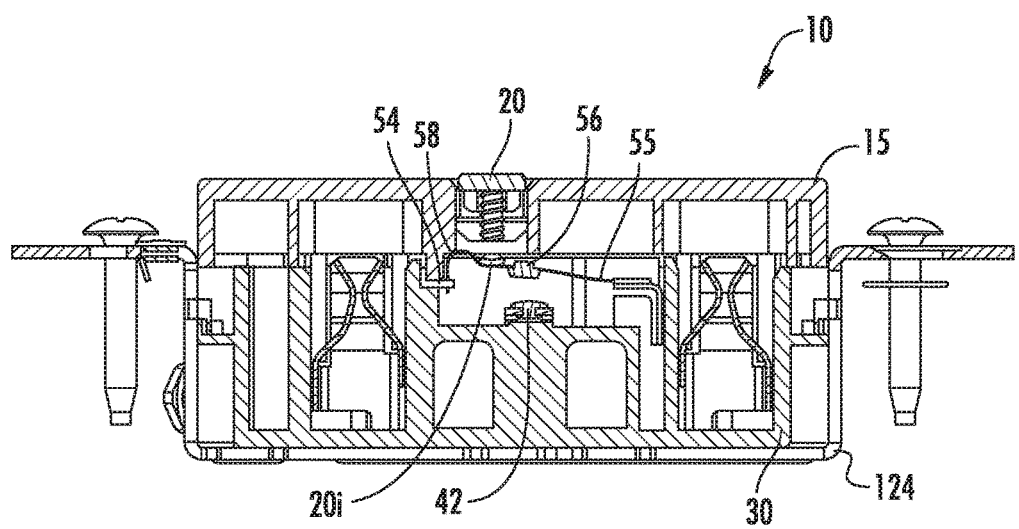
FIG. 7B is a side section view of the assembled power receptacle shown in FIG. 7A with the thermal protection plate in a deflected configuration to interrupt the circuit according to embodiments of the present invention.

The conductive member 56 of the thermal protection plate 55 can have a head 156 that is below the plate 55 that is larger than a segment that resides through and above the plate (FIGS. 7A, 7B). The head 156 can abut the conductive contact 42 of the receptacle during a normal working condition/status of the power receptacle (FIG. 7A). The head 156 can comprise silver or other suitably conductive material. The head 156 can have a circular perimeter and can taper to have a smaller diameter above the plate 55 as shown in FIGS. 5A, 5B, 6A, 6B. The electrical contact 56 can be a monolithic body with a maximal surface area portion residing facing the receptacle contact 42 and can comprise silver in an amount of between 50-100%.

As shown in FIG. 2, for example, the receptacle contact 42 can have a circular perimeter or be shaped as a disk as shown and can reside on planar extensions 140 of the receptacle 40 that are orthogonal to the terminals 52, 152 to face the reset member 20.

Figure 5B:
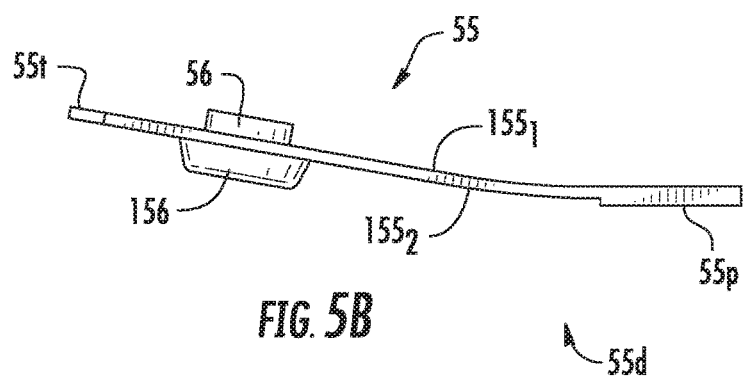
FIG. 5B is a side view of the thermal protection plate shown in FIG. 5A, in a deflected or deformed configuration according to embodiments of the present invention.

Referring to FIGS. 5A, 5B, 6A and 6B, the thermal protection plate 55 can have a first material layer $155_1$ with a first thermal expansion coefficient and a second material layer $155_2$ with a second, larger thermal expansion coefficient. In the embodiment shown, the second material layer $155_2$ can face the receptacle contact 42 and/or reside closer to the contact 42 and the first material layer $155_1$ can face and/or reside closer to the reset member 20. The first material layer $155_1$ can be described as a "passive" layer while the second material layer $155_2$ can be described as an "active" material layer as it has a larger thermal coefficient of expansion and causes the change in shape from the normal configuration 55n (FIGS. 5A, 6A) to the over temperature induced change configuration 55d (FIGS. 5B, 6B, 7B).

The thermal expansion plate 55 can be sufficiently thin so as to be able to "flex" from its non-loaded, non-assembled first "normal" configuration 55n (FIGS. 5A, 6A) to a flex normal operating configuration as shown in FIG. 7A, with the end of the plate closer to the electrical contact 56 flexed downward to reside below or more inward of the pad 55p in the orientation shown in FIG. 7A.

The first and second material layers $155_1$, $155_2$, can be provided in any suitable arrangement, such as in stacked layers of the same or different thickness, directly adjacent each other or with intervening material layers. The different layers $155_1$, $155_2$ can be laminated, riveted, brazed, welded or otherwise attached.

The first material layer $155_1$ can have a thermal coefficient of expansion that is between 0.5 and 4, inclusive thereof. The second material layer $155_2$ can have a thermal coefficient of expansion that is between 9 and 17, more typically between 10 and 12, inclusive thereof. The second material layer $155_2$ can have a thermal coefficient of expansion that is at least 2X more that the first material layer $155_1$, typically in a range of about 2×-10× greater than the first material layer $155_1$ at temperatures between 78 degrees Fahrenheit ("deg. F.") (about 26 deg. C.) to at least 200 deg. F. (about 90 deg. C.).

The thermal protection plate 55 can be a bimetal alloy plate. The thermal protection plate 55 can be a bonded and/or laminated plate and/or comprise coatings. The alloy material can comprise or be Ni22Cr3/Ni/Ni36. The high expansion layer (greater thermal coefficient of expansion) can comprise the Ni22Cr3 and the low or passive expansion layer can comprise Ni36, for example.

Example properties and material content of an example of suitable bimetal materials are shown below.

| Grade | C | Si | Mn | P |
|---|---|---|---|---|
| Ni36 | ≤0.05 | ≤0.3 | ≤0.6 | ≤0.02 |
| Ni22Cr3 | ≤0.35 | 0.15~0.3 | 0.3~0.6 | ≤0.02 |

| Grade | S | Ni | Cr | Cu | Fe |
|---|---|---|---|---|---|
| Ni36 | ≤0.02 | 35~37 | — | — | Bal. |
| Ni22Cr3 | ≤0.02 | 21~23 | 2.0~4.0 | — | Bal. |

| | |
|---|---|
| Density (g/cm3) | 8.2 |
| Electrical resistivity at 20 (mm²/m) | 0.8 ± 5% |
| Thermal conductivity, λ/W/(m*) | 22 |
| Elastic Modulus, E/Gpa | 147~177 |
| Bending K/$10^{-6-1}$ (20~135) | 14.3 |
| Temperature bending rate F./(20~130)$10^{-6-1}$ | 26.2% ± 5% |
| Allowable temperature ( ) | −70~350 |
| Linear temperature ( ) | −20~180 |

Referring to FIGS. 3, 4, 5A, 5B, 6A and 6B, the thermal protection plate 55 can have a pad 55p at one end portion 55e that can be affixed to the first terminal member 52, typically by welding, brazing or other suitable attachment method. The thermal protection plate 55 can have a tab 55t on the other end portion 55e that can engage the second terminal member 152.

The thermal protection plate 55 can have a different material composition or configuration over its length at various segments such as, for example, at the pad 55p and/or the tab 55t.

Referring to FIGS. 3, 4, 5A, 5B, 6A and 6B, the pad 55p can be thicker than all or a majority of the other portions of the thermal protection plate 55. The thermal protection plate 55 can be elongate and have a length associated with a long dimension of the receptacle 10 that is greater than a width. The thermal protection plate 55 can have a constant thickness over a longitudinal extent measured from an inner end 55i of the pad 55p to the opposing end 55e of the plate 55.

As shown in FIGS. 2, 3, and 4, for example, the thermal protection plate 55 can be an elongate plate with a width W that is in a range of about 4 mm and 12 mm. The thermal protection plate 55 can have a length L in a range of about 10 mm and about 30 mm. The thermal protection plate can have a thickness that is in a range of 0.1 mm and about 10 mm, more typically between about 0.1 mm and about 5 mm.

The plate 55 can have a length L that is sufficient to extend over at least half a length of an internal cavity space 50c (FIG. 3) between opposing ends of the terminals 52, 152.

As shown in FIGS. 3, 4, 7A and 7B, for example, the terminal assembly 50 may have a spring pad 58 that is attached to an inwardly extending arm segment 54 of the second terminal member 152. The inwardly extending arm segment 54 can be parallel to a longitudinal axis A-A of the terminal screws 60, but above or in front of the terminal screws 60. In the power receptacle 10, the thermal protection attachment pad 55p can have a fixed planar configuration on a parallel planar pad 53 of the first terminal member 52 irrespective of normal or over temperature condition (FIG. 7A, FIG. 7B, respectively).

As shown in FIG. 3, for example, the spring pad 58 can be arcuate and have a slot 58s that engages the tab 55t on one end portion and a tab 54t of the inwardly extending arm segment 54 of the second terminal member 152 on the other end portion. However, other attachment configurations may be used for the thermal protection plate 55 and the spring pad 58. The term "spring pad" refers to a member that has sufficient elasticity to be able to resiliently, if not elastically, deform to allow the end portion of the thermal protective plate 55e (FIG. 5A) attached thereto to rise in response to exposure to an elevated (defined threshold) temperature.

In some embodiments, the thermal protection plate 55 can act similar to a cantilevered beam to pivot up and down at the end 55e attached to the spring pad 58 to reside below the inwardly extending arm segment 54 in a normal operating state (FIG. 7A) and above the inwardly extending arm segment 54 in the circuit interruption state (FIG. 7B).

As also shown in FIGS. 7A and 7B, in a normal operating state, the inner end of the reset member 20i does not contact the thermal protection plate 55 but in the circuit interruption state the inner end of the reset member 20i is in contact with the thermal protection plate 55, typically adjacent the contact 56, and can translate inwardly a distance sufficient to push the thermal protection plate 55 inward to return it to its normal operating/working state position.

Referring to FIGS. 2, 3 and 4, the terminal assembly 50 may also include clamps 62 with tabs 62t that extend inward, typically parallel to a longitudinal axis A-A of the terminal screws 60. The clamps 62 have apertures 62a that align with apertures 52a, 152a in the first and second terminals 52, 152 for receiving the terminal screws 60. The first and second terminals 52, 152 can be joined by a medial top member 252. The clamps 62 can attach to primary bodies 52p, 152p of the terminals 52, 152, respectively. The clamp tabs 62 can reside in notches 152n, 52n of the terminals.

FIG. 2 shows that the receptacle 10 can have first and second terminal assemblies $50_1$, $50_2$ with respective thermal protection plates 55, each of which may cooperate with a separate or common reset member 20. A first terminal assembly $50_1$ can be a hot side (hot branch) and the second terminal assembly $50_2$ can be a neutral side (neutral load branch).

The thermal protection plates 55 of each terminal assembly $50_1$, $50_2$, may concurrently deflect in an over temperature and/or over current condition or may independently deflect.

Figure 8:
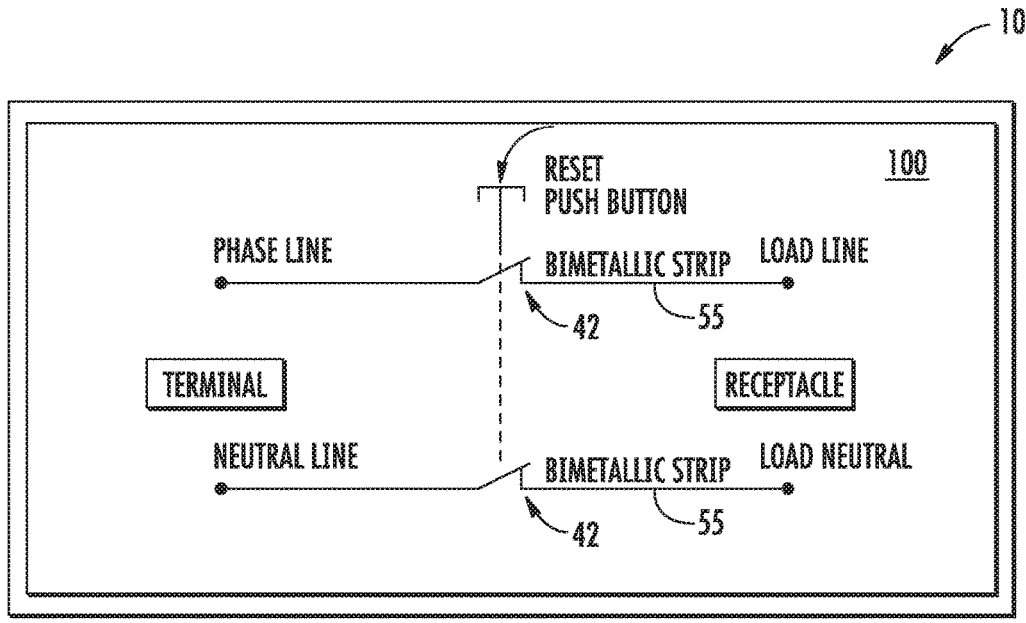
FIG. 8 is a circuit diagram of a power receptacle power circuit with the thermal protection member that can interrupt the circuit and be reset into a working position using a reset button/user input member according to embodiments of the present invention.

Generally stated, while the receptacle 10 is in normal use (FIG. 7A), there is load in a load circuit 100 (FIG. 8). However, the thermal protection plate 55 can change shape inside the power receptacle 10, i.e., deflect (FIG. 7B) to electrically disconnect or "break" the circuit 100 (FIG. 8) when a temperature rise of the terminal body 52 and/or receptacle conductive contact 42 reaches an elevated temperature, i.e., above 60 degrees Celsius ("deg. C."), more typically at or above 70 deg. C., such as at 75 deg. C. or at 80 deg. C., at 85 deg. C. or at 90 deg. C. The temperature can be measured at one or more of the terminal assembly 50, the receptacle 40 or contact 42 or the thermal protection plate 55.

The same change in position of the contact 56 and configuration change of the circuit interrupter member 55 can occur if the electrical current is over a rated amount, such as over 15 A (amps) or over 20 A, for respective 15 A and 20 A rated power receptacles. The reset member 20 can push the circuit interrupter member 55 back into a normal configuration and position to connect the circuit 100 to form a working circuit loop again. The thermal protection plate 55 can be equivalent to a resistor. When over a rated current, i.e., 15 A or 20 A, the temperature of the thermal protection plate 55 will rise to cause the change in shape of the plate 55 inside the power receptacle 10 to deflect and electrically disconnect from the load circuit.

The receptacle 10 can be configured as a single receptacle. In some embodiments, the receptacle 10 can be configured as a single gang, dual gang or other multiple gang receptacle. The receptacle 10 can be a three phase receptacle of suitable amperage and voltage rating for residential or commercial use. In some particular embodiments, the receptacle 10 can be a 15 A or 20 A rated device.

Figure 9:
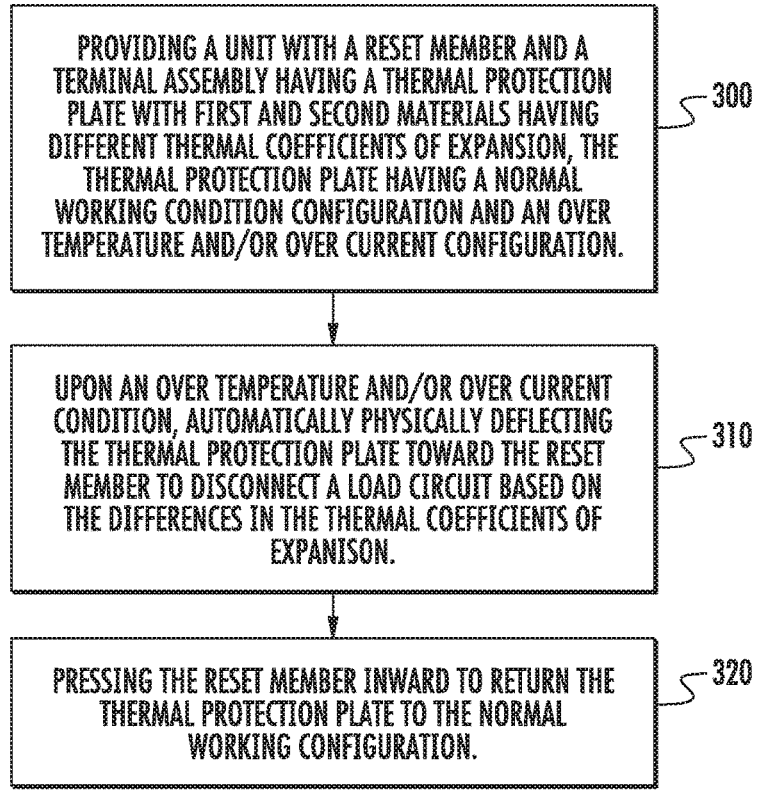
FIG. 9 is a flow chart of exemplary operations of operating a switch or power receptacle according to embodiments of the present invention.

FIG. 9 illustrates exemplary actions that can be used to operate a power receptacle, switch or other electrical unit. A unit with a reset member and a terminal assembly having a thermal protection plate with first and second materials having different thermal coefficients of expansion is provided, the thermal protection plate having a normal working condition configuration and an over temperature and/or over current configuration (block 300).

Upon an over temperature and/or over current condition, automatically physically deflecting the thermal protection plate toward the reset member to disconnect a load circuit based on the differences in the thermal coefficients of expansion (block 310).

Optionally, the deflection can occur at one end of the thermal protection plate using a spring pad attached thereto and attached to a terminal.

Pressing the reset member inward to return the thermal protection plate to the normal working condition configuration to reconnect the circuit (block 320).

The receptacle 10 can be configured as an Arc Fault Circuit Interrupter (AFCI) and/or Ground Fault Circuit Interrupter (GFCI) receptacle. As is well known, AFCI and GFCI receptacles are among a variety of overcurrent protection devices used for circuit protection and isolation. A GFCI is a device that shuts off an electric circuit when it detects that current is flowing along an unintended path to reduce the risk of electric shock. The GFCI can be manually reset by pushing the reset button. An AFCI can be designed to help prevent fires by detecting an unintended electrical arc and disconnecting the power before the arc starts a fire.

Figure 10:
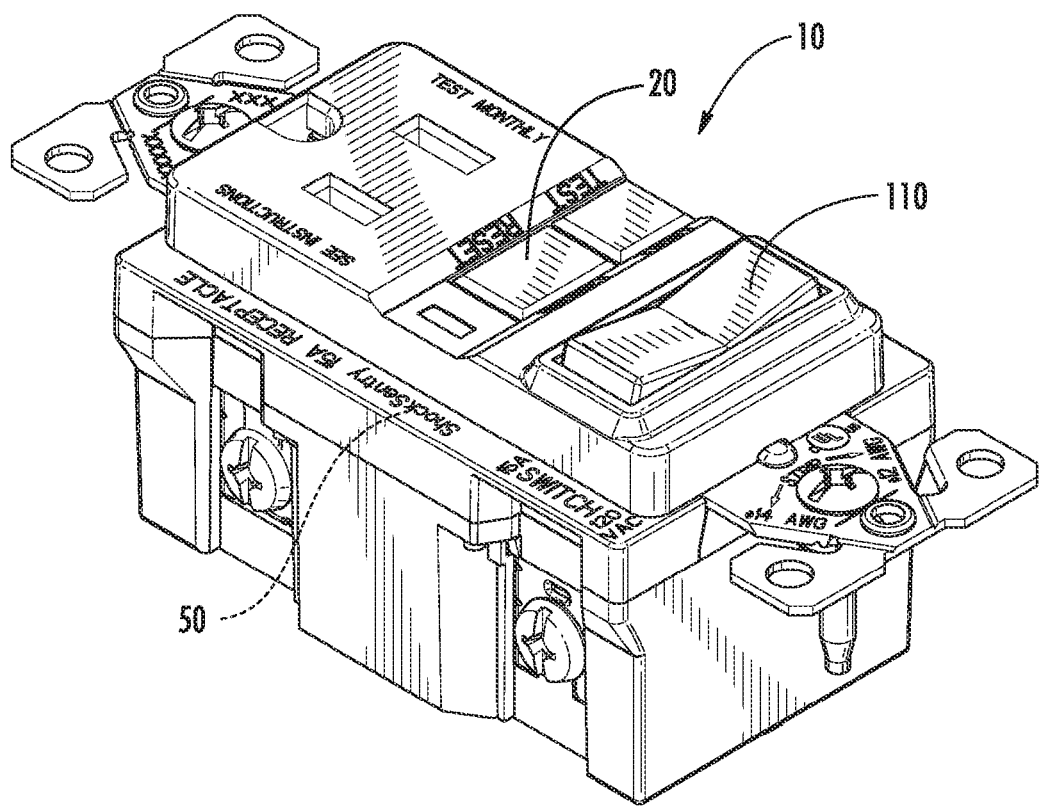
FIG. 10 is a front perspective view of another embodiment of a power receptacle according to embodiments of the present invention.

Although shown as for use with a power receptacle 10 having at least one plug-in, the terminal assembly 50 may be configured for other AFCI and/or GFCI applications such as an externally accessible user-switch for turning on and off a light source connected to the AFCI or GFCI circuit. For example, as shown in FIG. 10, the receptacle 10' can be a GFCI and/or AFCI receptacle unit with an external user-actuatable button or member 20 on the face of this unit 10, there is one switch 110 and one receptacle power outlet socket (instead of two adjacent power outlets as shown in FIG. 1). The switch 110 can be used as a simple switch or it can be wired to get GFCI (or AFCI) protection.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A terminal assembly comprising:
   a first terminal holding a first terminal screw;
   a second terminal adjacent the first terminal and holding a second terminal screw; and
   a thermal protection plate having longitudinally opposed first and second end portions, the first end portion affixed to the first terminal and the second end portion attached to the second terminal,
   wherein the thermal protection plate comprises an electrical conductive contact residing between the first and second end portions, closer to the second end portion than the first end portion, and wherein the thermal protection plate comprises a first material with a first thermal coefficient of expansion overlying or underlying a second material with a second thermal coefficient of expansion with the second thermal coefficient of expansion greater than the first thermal coefficient of expansion.

2. The assembly of claim 1, wherein, in position, the second material with the second thermal coefficient of expansion resides under or behind the first material, wherein the thermal protection plate has a thickness in a range of 0.1 mm and 10 mm, a width in a range of 4 mm and 12 mm, and wherein the second thermal coefficient of expansion is at least twice that of the first thermal coefficient of expansion in a temperature range between 26 degrees Celsius and 70 degrees Celsius.

3. The assembly of claim 1, wherein, in position and in a normal operating configuration, the thermal protection plate has a first configuration, wherein, in response to an over temperature condition that is above a defined temperature, the second end portion of the thermal protection plate moves toward the reset member while attached to the second terminal and while the first end portion is affixed to the first terminal, and wherein the assembly is in communication with an external reset member that can be externally pushed to engage the thermal protection plate and push the plate inward to return to the first configuration.

4. The assembly of claim 1, wherein the first end portion of the thermal protection plate comprises an attachment pad and is statically affixed to the first terminal, and wherein the second terminal comprises a primary body holding an inwardly extending segment that is parallel to a longitudinal axis of the first and second terminal screws and is attached to the second end portion of the thermal protection plate.

5. The assembly of claim 1 in combination with a power receptacle device and/or an electrical switch device, comprising:
   a housing;
   a reset member held by the housing; and
   the terminal assembly of claim 1 held in the housing with the thermal protection plate in communication with the reset member.

6. The device of claim 5, wherein the device is a power receptacle with a cover having at least one electrical outlet, wherein the device further comprises a receptacle structure in the housing in cooperating alignment with the terminal assembly, and wherein the receptacle structure comprises an electrical contact that engages the electrical conductive contact of the thermal protection plate during normal operating conditions.

7. The device of claim 6, wherein the second end portion of the thermal protection plate is attached to a spring pad that is attached to the inwardly extending segment of the second terminal to provide the attachment of the second end portion of the thermal protection plate to the second terminal, wherein, during normal operating conditions, the spring pad cooperates with the second end portion of the thermal protection plate to hold the thermal protection plate in a first configuration with the electrical conductive contact of the thermal protection plate contacting the electrical contact of the receptacle, and wherein, in response to an over temperature condition, the thermal protection plate changes shape to have a second configuration which moves the thermal protection plate electrical conductive contact toward the reset member and disengages the receptacle electrical contact.

8. The assembly of claim 1, wherein the electrical conductive contact of the thermal protection plate has a body with a maximal surface area portion facing inward and residing below or behind the thermal protective plate in a direction away from the reset member.

9. The assembly of claim 1, wherein the electrical conductive contact of the thermal protection plate comprises silver in an amount in a range of 50-100%.

10. The assembly of claim 1 held in a power receptacle device, the power receptacle device further comprises a cover with first and second electrical outlets attached to the housing, wherein the first and second terminals reside inside the housing adjacent one long side thereof and are a first set of terminals with respective terminal screws, and wherein the device further comprises a second set of terminals laterally spaced apart from and facing the first set of terminals and comprising:
   a second thermal protection plate protection plate having longitudinally opposed first and second end portions, the first end portion affixed to the first terminal of the second set of terminals and the second end portion attached to the second terminal of the second set of terminals,
   wherein the second thermal protection plate is parallel to the thermal protection plate of the first set of terminals,
   wherein the second thermal protection plate comprises an electrical conductive contact residing between the first and second end portions, closer to the second end portion than the first end portion, and
   wherein the second thermal protection plate comprises a first material with a first thermal coefficient of expansion overlying a second material with a second thermal coefficient of expansion with the second thermal coefficient of expansion greater than the first thermal coefficient of expansion.

11. The device of claim 10, wherein the device comprises a ground strap coupled to the housing.

12. The assembly of claim 1, wherein the first terminal of the terminal assembly has a primary body with a terminal screw aperture, wherein the primary body of the first terminal holds an inwardly extending segment with a planar segment that is attached to the first end portion of the thermal protection plate.

13. The assembly of claim 1, wherein the second terminal of the terminal assembly has a primary body with a terminal screw aperture, wherein the primary body of the second terminal holds an inwardly extending arm with a planar segment that is attached to the second end portion of the thermal protection plate to attach the second end portion to the second terminal assembly.

14. The assembly of claim 1, wherein the second end portion of the thermal protection plate has a tab end that is attached to a slot in a planar segment of an inwardly extending arm of the second terminal, and wherein the assembly further comprises first and second clamps with terminal screw apertures attached to the first and second terminals, respectively.

15. The assembly of claim 1, wherein the thermal protection plate comprises first and second different nickel alloy materials as the first and second materials.

16. The assembly of claim 1, wherein the thermal protection plate comprises Ni22Cr3 as the second material.

17. The assembly of claim 1, wherein the thermal protection plate comprises Ni36 as the first material.

18. A method of operating a power receptacle, comprising:
   electrically powering a power receptacle using a terminal assembly with a thermal protection plate that is attached at a first end portion to a first terminal and attached at a second end portion to a second terminal with an electrical contact in electrical communication with a receptacle electrical contact to provide a load circuit when the thermal protection plate has a first normal operating configuration;
   mechanically changing a shape of the thermal protection plate to a second different configuration while the first and second ends portions remain attached to the corresponding first and second terminals in response to exposure to an elevated temperature condition to move the electrical contact of the thermal protection plate away from the receptacle electrical contact and disconnect the load circuit; and
   pressing against a reset member to push the thermal protection plate inward and back into the first normal operating configuration to reconnect the load circuit.

19. The method of claim 18, wherein the second terminal has an inwardly extending arm that is attached to a spring pad, wherein the spring pad is attached to the second end portion of the thermal protection strip and allows the second end portion of the thermal protection strip to travel up toward the reset member in response to the exposure to the elevated temperature and also holds the second end portion down with the electrical contact against the receptacle electrical contact when the thermal protection plate is in the first normal operating configuration.

20. The method of claim 18, wherein the power receptacle has first and second sets of terminal assemblies laterally spaced apart and facing each other, each with a respective thermal protection plate as first and second thermal protection plates, and wherein the mechanically changing step is carried out to concurrently mechanically change the shape of the first and second thermal protection plates to the second different configuration.

\* \* \* \* \*